US009253399B2

(12) United States Patent
Okamoto

(10) Patent No.: US 9,253,399 B2
(45) Date of Patent: Feb. 2, 2016

(54) PHOTOGRAPHING APPARATUS WHERE AN IMAGE IS OBTAINED BY AN INTERMITTENT PHOTOGRAPHING OPERATION

(71) Applicant: PENTAX RICOH IMAGING COMPANY, LTD., Tokyo (JP)

(72) Inventor: Teppei Okamoto, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/625,034

(22) Filed: Feb. 18, 2015

(65) Prior Publication Data

US 2015/0163404 A1  Jun. 11, 2015

Related U.S. Application Data

(63) Continuation of application No. 12/022,243, filed on Jan. 30, 2008, now Pat. No. 8,988,540.

(30) Foreign Application Priority Data

Feb. 1, 2007  (JP) .............................. P2007-023188

(51) Int. Cl.
H04N 5/232 (2006.01)
(52) U.S. Cl.
CPC ........... *H04N 5/23241* (2013.01); *H04N 5/232* (2013.01); *H04N 5/23245* (2013.01)
(58) Field of Classification Search
CPC ......... H04N 1/212; H04N 1/215; H04N 1/21; H04N 1/2104; H04N 1/2112; H04N 5/23245; H04N 7/0127; H04N 7/468; H04N 5/23241; H04N 5/3698; H04N 1/00885–1/00896; G03B 2217/007; G03B 7/26; G03B 2217/26

USPC ....................................................... 348/220.1
See application file for complete search history.

(56) References Cited

U.S. PATENT DOCUMENTS 6,289,162 B1 * 9/2001 Uehara ................. H04N 5/783
386/205
6,774,946 B1    8/2004 Misawa et al.
(Continued)

FOREIGN PATENT DOCUMENTS

JP  07-184103    7/1995
JP  07-184104    7/1995
(Continued)

OTHER PUBLICATIONS

Japan Office action, dated Apr. 12, 2011 along with an English translation thereof.

*Primary Examiner* — Pritham Prabhakher
(74) *Attorney, Agent, or Firm* — Greenblum & Bernstein P.L.C.

(57) ABSTRACT

A photographing apparatus comprises an imaging sensor, a power supply controller, and a moving-picture generator. The imaging sensor continuously performs imaging operations in a predetermined interval. The power supply control unit controls power supply to the imaging sensor during a waiting period that is defined as a period from the end of one imaging operation of the imaging operations to the beginning of the next imaging operation of the imaging operations. The moving-picture generator generates a moving-picture file by incorporating a plurality of still pictures, obtained by the imaging operations, into a frame composing a moving picture.

5 Claims, 5 Drawing Sheets

(56) References Cited

U.S. PATENT DOCUMENTS

| | | | |
|---|---|---|---|
| 7,471,334 B1 | 12/2008 | Stenger | |
| 7,623,158 B2 | 11/2009 | Kunieda | |
| 7,630,015 B2 | 12/2009 | Okamura | |
| 7,643,070 B2 | 1/2010 | Ono | |
| 8,023,796 B2 * | 9/2011 | Asada | H04N 5/77 386/232 |
| 2002/0021364 A1 | 2/2002 | Asada et al. | |
| 2003/0199995 A1 * | 10/2003 | Ishii | G05B 15/02 700/9 |
| 2004/0081437 A1 * | 4/2004 | Asada | H04N 5/77 386/233 |
| 2004/0109067 A1 | 6/2004 | Yokoi | |
| 2006/0219861 A1 * | 10/2006 | Wood | G08B 13/19634 250/208.1 |
| 2006/0244917 A1 * | 11/2006 | Weisgerber | G03B 21/40 352/84 |
| 2006/0256203 A1 | 11/2006 | Honma | |
| 2006/0268117 A1 | 11/2006 | Loui et al. | |
| 2007/0103561 A1 | 5/2007 | Kunieda | |
| 2007/0271388 A1 * | 11/2007 | Bowra | H04L 65/602 709/231 |
| 2008/0031318 A1 * | 2/2008 | Ha | H04N 7/0112 375/240.2 |
| 2008/0055318 A1 * | 3/2008 | Glen | G09G 3/20 345/501 |
| 2008/0063287 A1 * | 3/2008 | Klamer | G11B 27/329 382/232 |

FOREIGN PATENT DOCUMENTS

| | | |
|---|---|---|
| JP | 11-231385 | 8/1999 |
| JP | 2000-92437 | 3/2000 |
| JP | 2004-015356 | 1/2004 |

* cited by examiner

PHOTOGRAPHING APPARATUS WHERE AN IMAGE IS OBTAINED BY AN INTERMITTENT PHOTOGRAPHING OPERATION

CROSS-REFERENCE RELATED APPLICATIONS

The present application is a continuation of U.S. application Ser. No. 12/022,243, filed Jan. 30, 2008, the disclosures of which are incorporated herein by reference in its entirety.

BACKGROUND OF THE INVENTION

1. Field of the Invention

The present invention relates to a photographing apparatus, and in particular to the photographing apparatus that continuously performs the imaging operations in a predetermined interval.

2. Description of the Related Art

A photographing apparatus that can perform an intermittent photographing operation that continuously performs imaging operations in a predetermined interval is proposed.

Japanese unexamined patent publication (KOKAI) No. 2004-15356 discloses a photographing apparatus that can perform the intermittent photographing operation.

However, it is necessary to access a plurality of files corresponding to the plurality of still pictures that are obtained by the intermittent photographing operation, in order to confirm the image obtained by the intermittent photographing operation.

SUMMARY OF THE INVENTION

Therefore, an object of the present invention is to provide a photographing apparatus where the image obtained by the intermittent photographing operation can be easily confirmed.

According to the present invention, a photographing apparatus comprises an imaging sensor, a power supply control unit, and a moving-picture generating unit. The imaging sensor continuously performs imaging operations in a predetermined interval. The power supply control unit controls a power-supply operation to the imaging sensor during a waiting period that is defined as a period from the end of one imaging operation of the imaging operations to the beginning of the next imaging operation of the imaging operations. The moving-picture generating unit generates a moving-picture file based on still pictures obtained by the imaging operations.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
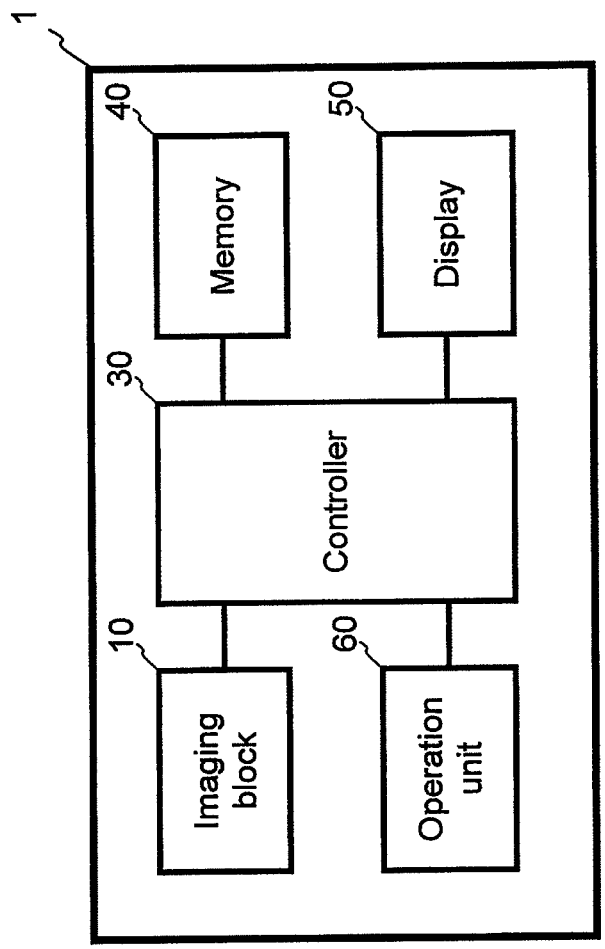
FIG. 1 is a construction diagram of the photographing apparatus in the embodiment.

The present invention is described below with reference to the embodiment shown in the drawings. In the embodiment, the photographing apparatus 1 is a digital camera. The photographing apparatus 1 has an imaging block 10, a controller 30, a memory 40, a display 50, and an operation unit 60 (see FIG. 1).

The imaging block 10 has a photographing optical system, an imaging sensor such as a CCD, or a CMOS, etc., and a signal-processing circuit.

The photographic subject image is captured as an optical image through (via) the photographing optical system on an imaging surface of the imaging sensor. The imaging sensor converts the optical image to an electric signal by photoelectric conversion. After the electric charge is accumulated for a predetermined time (the exposure time) on the imaging sensor in the imaging operation, the electric signal based on the accumulated electric charge is output from the imaging sensor to the signal-processing circuit. The signal-processing circuit outputs the electric signal corresponding to the photographing subject that is obtained by the imaging operation, to the controller 30 as an image signal.

The imaging sensor continuously performs the imaging operations in a photographing interval TI, while an intermittent photographing operation, described later, is performed.

The controller 30, which may be a CPU (Central Processing Unit) or a DSP (Digital Signal Processor), etc. controls each part of the photographing apparatus 1.

In the embodiment, the controller 30 has a power-supply function that controls the power-supply operation to the imaging sensor, etc., during the waiting period of an intermittent photographing operation to be described later, and has a moving-picture generating function that generates a moving-picture file based on still pictures obtained by the intermittent photographing operation.

The controller 30 outputs an image data that can be stored in the memory 40, on the basis of the image signal that is output from the imaging block 10. Furthermore, in the embodiment, the controller 30 controls the imaging block 10 in order to perform the intermittent photographing operation which performs the plurality of imaging operations in a predetermined time interval (the photographing interval TI). The controller 30 generates the moving-picture file with a frame rate FR on the basis of the still pictures corresponding to the image signals obtained by the imaging operations in the photographing interval TI, and stores the moving-picture file to the memory 40.

The memory 40 stores the image data (the moving-picture file) corresponding to the moving picture obtained by the plurality of imaging operations in a predetermined file format, such as Motion JPEG etc.

The display 50 displays the moving picture corresponding to the moving-picture file obtained by the plurality of imaging operations and information regarding the operation.

Furthermore, the memory 40 may store an image data (e.g., a still-picture file) corresponding to a still picture, among the still pictures composing the moving-picture file.

The operation unit 60 is used for an ON/OFF control of a release switch (not depicted); a setting of parameters that are used for the intermittent photographing operation, such as the photographing interval TI, a photographing time length TL from when the first imaging operation of the intermittent photographing operation commences to when the last imaging operation of the intermittent photographing operation commences, a start time TS when the first imaging operation commences, and the frame rate FR, etc.; and a switching operation between an intermittent photographing mode for performing the intermittent photographing operation and another photographing mode for performing other photographing operations.

The waiting period is defined as the period in the intermittent photographing mode from the end of the imaging operation to the beginning of the next imaging operation.

During the waiting period, the power-supply operation to all parts of the photographing apparatus 1, except for a control part including a clock that controls the photographing interval TI, such as the one in the controller 30 etc., are stopped; in other words, the photographing apparatus 1 is set to a sleep mode.

Aside from the control part of the photographing apparatus 1, there are exothermic parts that generate heat from continuous use, such as the imaging sensor, etc., of the imaging block 10, and high electric demand parts, such as the LCD of the display 50, etc.

By cutting the power supply to the exothermic parts, the heat build-up of the photographing apparatus 1 can be reduced.

By cutting the power supply to the high power-demanding parts, the electric consumption of the photographing apparatus 1 can be reduced as well.

In order to perform the intermittent photographing operation in the intermittent photographing mode, the imaging operations that capture the still picture are continuously performed, in the photographing interval TI, after the start time TS, for the photographing time length TL.

The still pictures corresponding to the image signals captured by the imaging operations are arranged in a time series, and are incorporated into the frames composing the moving picture. Then, the moving-picture file is generated.

In order to adjust the playback speed of the moving picture, it is desirable to duplicate all the still pictures before arranging them in the time series. At duplication, the same number of duplicates are made for each still picture.

Figure 2:
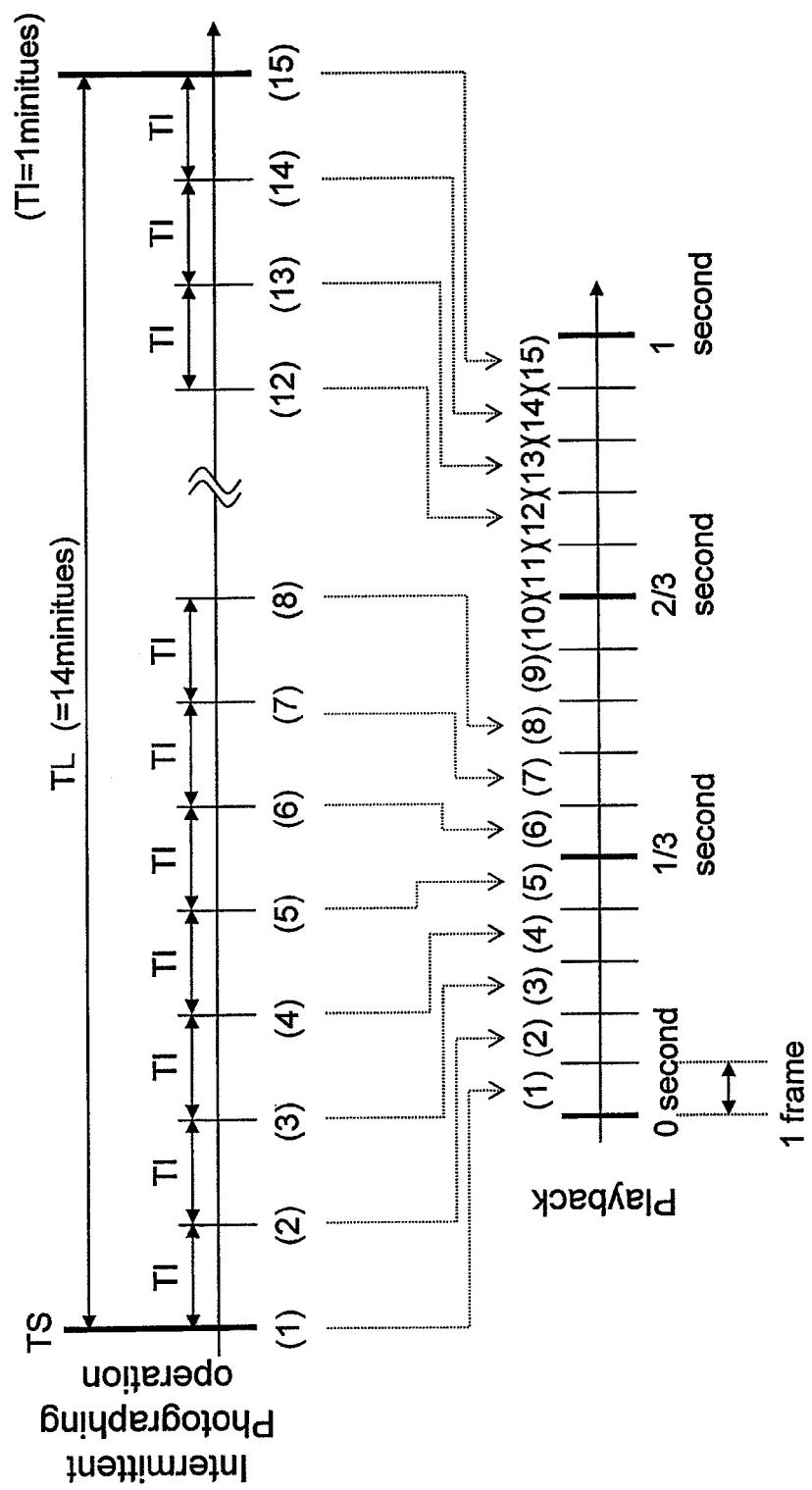
FIG. 2 is a figure that shows a relationship between the frames and the still pictures when the still pictures are incorporated into the frames without duplication of the still pictures.

For example, when the parameters are set to the frame rate FR of 15 fps, the photographing interval TI of 1 minute, and the photographing time length TL of 14 minutes, a moving-picture file is generated with a playback length of 1 second with 15 still pictures obtained by the 15 imaging operations (see FIG. 2). In other words, a group of still images that are obtained by the imaging operations over 14 minutes, is converted to the moving-picture file whose playback length is 1 second.

The moving picture corresponding to such a moving-picture file is hard to appreciate because of its brevity. In other words, when the frame rate FR is high (fast) or the photographing time length TL is long, the playback speed of the moving picture becomes fast (e.g., the playback length of the moving picture becomes short), so that it becomes hard to appreciate.

On the other hand, four copies of each still picture are made so that the same five still pictures are sequentially arranged followed by the next set of five duplicate still pictures, and so on, such that the moving-picture file is generated on the basis of the sequentially arranged still pictures. Thus, when the actual frame rate FR of the moving-picture file is 3 fps, the playback length is 5 seconds, that is, 5 times of the length of the moving picture without duplication. In other words, the playback speed of the moving picture is slowed compared to the playback speed without duplication (see FIG. 3).

Figure 3:
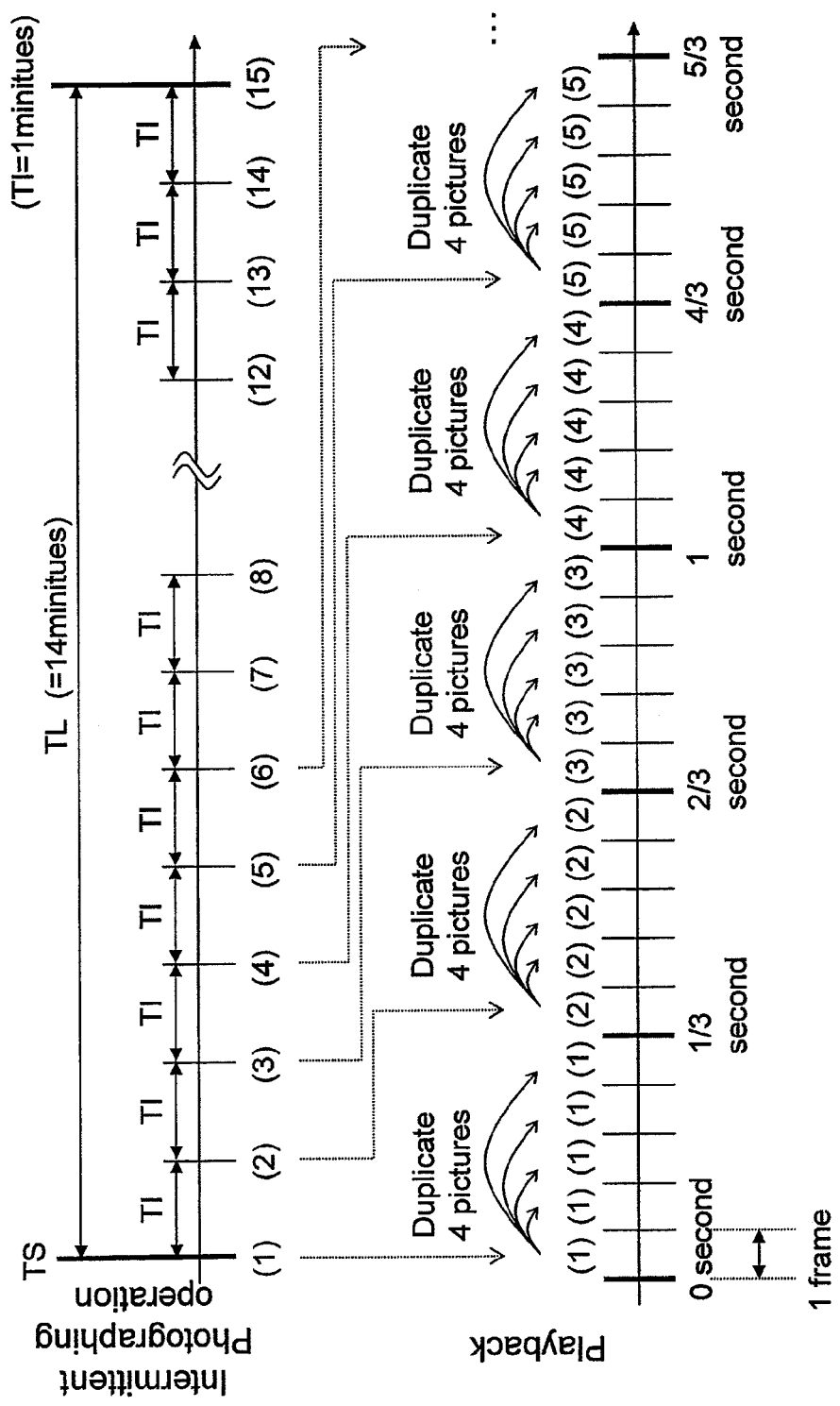
FIG. 3 is a figure that shows the relationship between the frames and the still pictures when the still pictures including the duplicated still pictures are incorporated into the frames.

In FIGS. 2 and 3, the numbers in parentheses show the order of the still images obtained by the imaging operations.

Figure 4:
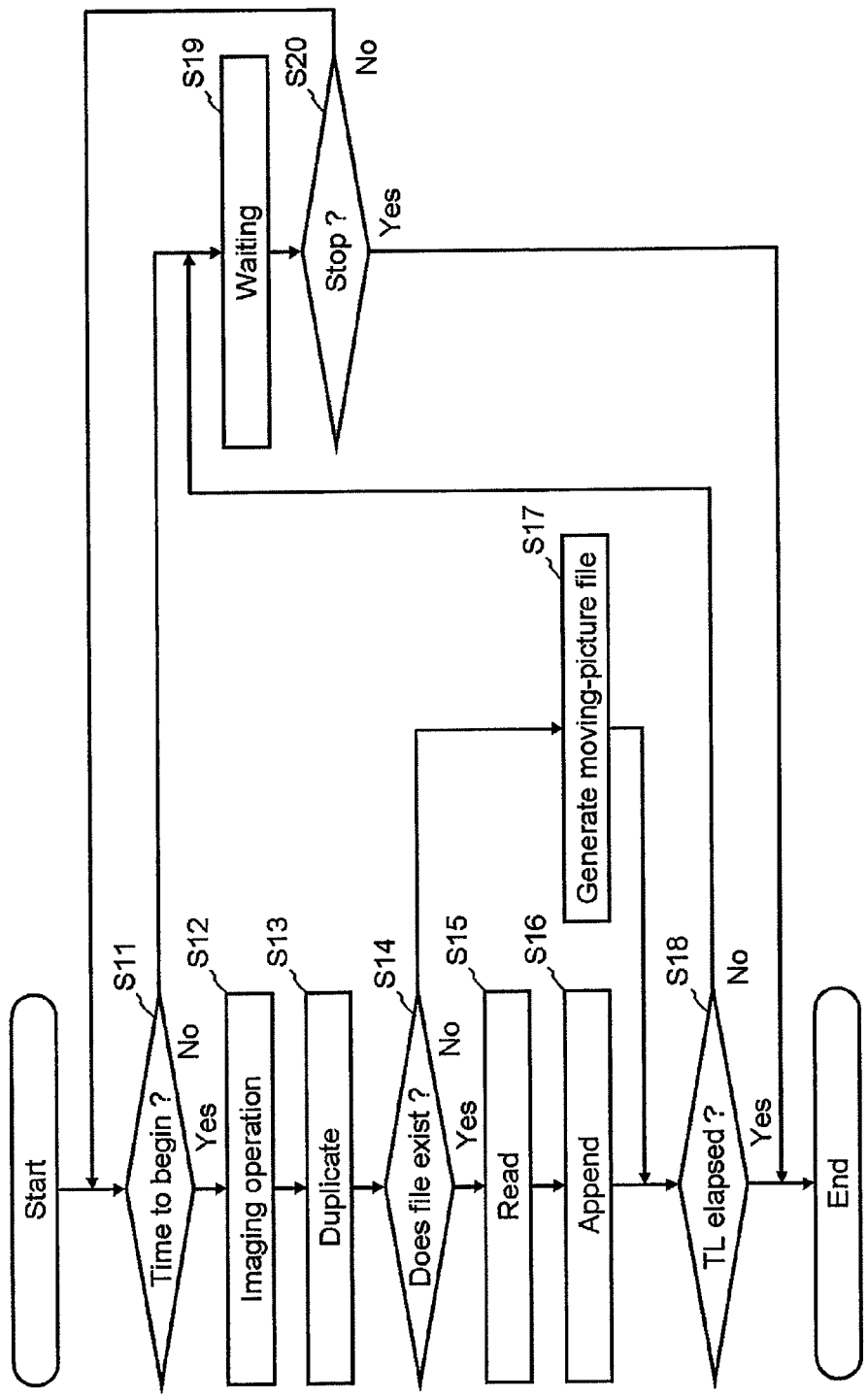
FIG. 4 is a flowchart that shows the process of the intermittent photographing operation.

In the case that it is unnecessary to adjust the playback speed of the moving picture, the duplication described in step S13 of FIG. 4 may be omitted. Specifically, in the case that the frame rate FR is sufficiently low (slow) or the photographing interval TI is sufficiently short, etc., the playback speed of the moving picture is sufficiently slow so as to be perceivable as a moving picture, and it is unnecessary to adjust the playback speed of the moving picture.

The operation for generating the moving-picture file is performed whenever the imaging operation for the intermittent photographing operation is performed. Namely, after the imaging operation for the intermittent photographing operation is performed, the still picture that is obtained by this imaging operation and the duplicated still picture(s) are appended to the moving-picture file.

Therefore, even if the intermittent photographing operation is interrupted, the moving-picture file is generated on the basis of the still picture(s) obtained by the imaging operations) prior to the interruption.

Next, the flow of the intermittent photographing operation in the embodiment will be explained with reference to the flowchart in FIG. 4.

When the photographing apparatus 1 is set to the intermittent photographing mode and the release button or the start button for the intermittent photographing operation is operated by the user's operation of the operation unit 60, the intermittent photographing operation commences.

In step S11, it is determined whether the current time is the time to begin the imaging operation in the intermittent photographing operation. In other words, it is determined whether the current time is equal to the start time TS or to a time that is an integral multiple of the photographing interval TI, given by TI×n, where n is a counting number, which has elapsed from the start time TS.

When it is determined that the current time is the time to begin the imaging operation in the intermittent photographing operation, the operation continues to step S12, otherwise, the operation proceeds directly to step S19.

In step S12, the imaging operation for obtaining one still picture is performed. In step S13, a copy or copies of the still picture that is obtained in step S12 is/are made.

In step S14, it is determined whether the moving-picture file including the still picture obtained in step S12 has already been stored in the memory 40.

When the first imaging operation is performed immediately after the start time TS, the moving-picture file including the still picture obtained in step S12 has not yet been stored in the memory 40. This is because the first still picture corresponding to the first imaging operation is stored in the memory 40 as a moving-picture file after the first imaging operation. Therefore, the operation proceeds directly to step S17.

When the $n^{th}$ imaging operation is performed, at a time period which is an integral multiple of the photographing interval TI, (that is, given by TI×n) has elapsed after the start time TS, the moving-picture file including the first to $n^{th}$ still pictures have already been stored in the memory 40. After the $n^{th}$ imaging operation, the $(n+1)^{th}$ still picture is appended to the moving-picture file including the first to $n^{th}$ still pictures held in the memory 40. Thereupon the operation continues to step S15.

In step S15, the moving-picture file that is generated on the basis of the first to $n^{th}$ still pictures including the duplicated first to $n^{th}$ still pictures is read from the memory 40. In step S16, the $(n+1)^{th}$ still picture including the duplicated $(n+1)^{th}$ still picture(s) is/are appended to the moving-picture file that is read from the memory 40 in step S15. Then the moving-picture file to which the (n+1)$^{th}$ still picture is appended is stored (overwritten) in the memory 40.

In step S17, the moving-picture file based on the first still picture including the duplicated first still picture(s) is generated and stored in the memory 40.

In step S18, it is determined whether the elapsed time from the start time TS is equal to the photographing time length TL. When it is determined that the elapsed time from the start time TS is equal to the photographing time length TL, the intermittent photographing operation is terminated, otherwise, the operation continues to step S19.

In step S19, the photographing apparatus 1 is set to the sleep mode during the waiting period that is defined as the period from the end of the imaging operation to the beginning of the next imaging operation.

In step S20, it is determined whether termination of the intermittent photographing operation is ordered by the user's operation of the operation unit 60.

When it is determined that the termination of the intermittent photographing operation is operated, the intermittent photographing operation is terminated, otherwise, the operation returns to step S11 for the next imaging operation of the intermittent photographing operation.

In the embodiment, during the waiting period defined as the period in the intermittent photographing mode from the end of the imaging operation to the beginning of the next imaging operation, the power supply to each part of the photographing apparatus 1 except for the controller 30, is cut. In other words, the photographing apparatus 1 is set to the sleep mode.

By cutting the power supply to the most exothermic parts, waste heat from the photographing apparatus 1 including the imaging sensor, can be effectively reduced.

By cutting the power supply to the most power-demanding parts, the electric consumption of the photographing apparatus 1 including the display 50 can be effectively reduced. Therefore, a prolonged intermittent photographing operation can be performed even if the photographing apparatus 1 is driven by a battery.

Furthermore, in the case that the photographing apparatus 1 is a dust- and water-proofed camera, since the intermittent photographing operation can be performed under conditions where the photographing apparatus 1 is set outdoors for a long time, time exposures of slow events such as flower blossoming can be captured.

Moreover, because the electric consumption can be reduced, a strobe light can be used in each imaging operation of the intermittent photographing operation so that the photographing subjects can be captured under dark conditions.

Figure 5:
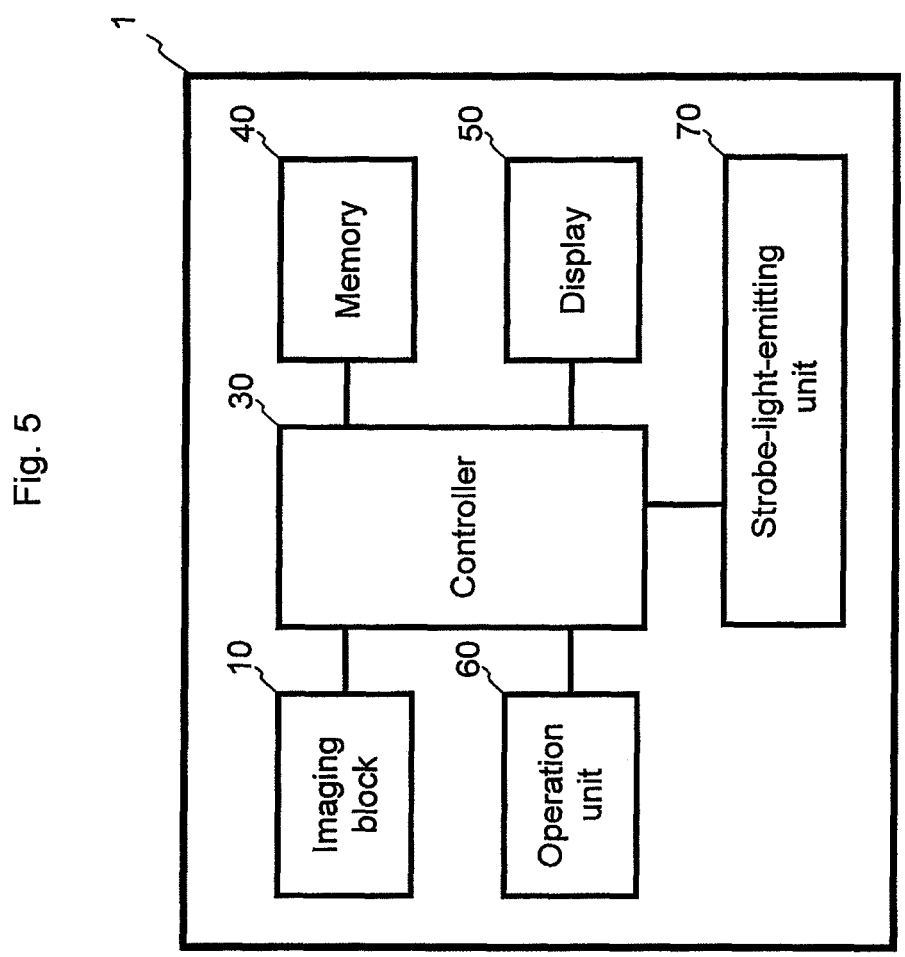
FIG. 5 is a construction diagram of the photographing apparatus including the strobe-light-emitting unit.

In this case, either the photographing apparatus 1 or another apparatus is provided with a strobe-light-emitting unit 70 (see FIG. 5) that flashes in synchrony with the imaging operations in the intermittent photographing operation.

Furthermore, the still pictures obtained by the imaging operations for the intermittent photographing operation are incorporated into the frames composing the moving picture so that the moving-picture file is generated. Therefore, the user can easily confirm the image (the moving picture represented in the moving-picture file) by playing back the moving-picture file on the display 50 or a personal computer (not depicted).

Furthermore, the still picture obtained by the latest imaging operation is appended to the moving-picture file whenever the imaging operation for the intermittent photographing operation is performed (see steps S15 and S16 in FIG. 4).

Therefore, even if the intermittent photographing operation is interrupted, the moving-picture file will be generated on the basis of the still picture(s) obtained by the imaging operation(s) prior to the interruption.

Furthermore, when the frame rate FR is high (fast) or the photographing interval TI is long, so that the playback speed of the moving picture becomes fast (i.e., the playback length of the moving picture becomes short), the actual frame rate is adjusted such that the predetermined pieces of the still pictures are duplicated and the original still picture and the duplicated still picture(s) are continuously incorporated into the frames composing the moving picture. Thus, the user can comfortably appreciate a moving picture whose actual frame rate has been adjusted.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2007-023188 (filed on Feb. 1, 2007) which is expressly incorporated herein by reference, in its entirety.

The invention claimed is:

1. A photographing apparatus comprising:
   an imaging sensor that continuously performs a series of imaging operations in a predetermined interval;
   a controller that controls power-supply to the imaging sensor during a waiting period that is a period from the end of one imaging operation to the beginning of the next imaging operation in the series of imaging operations and generates a moving-picture file by incorporating a plurality of still pictures, which are obtained by the continuous series of imaging operations, into a frame composing a moving picture;
   wherein the controller, every time the imaging operation for obtaining one still image is performed, duplicates the plurality of still pictures by a predetermined number, respectively, to obtain a plurality of duplicated still pictures, arranges the plurality of still pictures and the plurality of duplicated still pictures in the order of the imaging operations to generate the moving-picture file, and changes a frame rate of the moving-picture file by changing the predetermined number, and
   wherein the controller generates the moving-picture file and duplicates the plurality of still pictures during the imaging operation for obtaining one still image.

2. The photographing apparatus according to claim 1, wherein the controller increases the predetermined number when the frame rate is large, and reduces the predetermined number when the frame rate is small.

3. The photographing apparatus according to claim 1, wherein the controller controls the power-supply for the moving-picture generator during the waiting period.

4. The photographing apparatus according to claim 1, wherein the predetermined interval, a start time of the continuous series of imaging operations, and a photographing time length for the continuous series of imaging operations are settable.

5. The photographing apparatus according to claim 1, wherein the controller duplicates the plurality of still pictures while the imaging sensor is performing the series of imaging operations.

* * * * *